United States Patent
Edwards (10) Patent No.: US 10,231,384 B2
(45) Date of Patent: Mar. 19, 2019

(54) APPARATUS TO SUSPEND BOUQUETS IN A VEHICLE

(71) Applicant: Anna Lynette Edwards, Durham, NC (US)

(72) Inventor: Anna Lynette Edwards, Durham, NC (US)

( * ) Notice: Subject to any disclaimer, the term of this patent is extended or adjusted under 35 U.S.C. 154(b) by 301 days.

(21) Appl. No.: 15/091,029

(22) Filed: Apr. 5, 2016

(65) Prior Publication Data

US 2017/0280631 A1   Oct. 5, 2017

(51) Int. Cl.
  *A01G 5/04* (2006.01)
  *B60R 11/00* (2006.01)
  *A47G 7/06* (2006.01)

(52) U.S. Cl.
  CPC .............. *A01G 5/04* (2013.01); *A47G 7/063* (2013.01); *B60R 11/00* (2013.01); *A47G 2007/066* (2013.01); *B60R 2011/0017* (2013.01)

(58) Field of Classification Search
  CPC . A01G 5/04; A01G 5/00; A01G 18/66; A01G 9/024; A01G 9/026; A47G 7/04; A47G 7/044; A47G 7/045; A47G 7/047; A47G 7/06; A47G 7/063; A47G 2007/066; A47G 7/07; A47G 7/00; B60R 11/00; B60R 2011/0017
  See application file for complete search history.

(56) References Cited

U.S. PATENT DOCUMENTS

| | | | |
|---|---|---|---|
| 591,390 A | 10/1897 | Dunnigan | |
| 599,119 A | 2/1898 | Coolidge | |
| 610,251 A | 9/1898 | Wall | |
| 650,632 A | 5/1900 | Coolidge | |
| 651,647 A | 6/1900 | Bird | |
| 906,713 A | 12/1908 | Hinman | |
| 2,462,187 A | 2/1949 | Helixon | |
| 2,633,278 A | 3/1953 | Muniz | |
| 2,763,413 A | 9/1956 | Felton | |
| 2,989,173 A | 6/1961 | Zacks | |
| 3,040,966 A * | 6/1962 | Crane | B65D 29/04 383/103 |
| 3,245,606 A * | 4/1966 | Crane | B65D 33/01 383/103 |
| D209,279 S | 11/1967 | Cohen | |

(Continued)

FOREIGN PATENT DOCUMENTS

GB      2147484    *  5/1985   ............. A01G 9/022

OTHER PUBLICATIONS

Mobile Flower, www.amazon.com/MOBILE-FLOWER-Reusable-Bouquet-Carrier/dp/B00LWGRACW, published May 19, 2015, retrieved May 16, 2018.*

(Continued)

*Primary Examiner* — Kathleen I Alker (74) *Attorney, Agent, or Firm* — Olive & Olive, P.A.

(57) ABSTRACT

A sleeve apparatus includes a sleeve member with a top opening and a bottom opening. At least one slot is cut into a wall of the sleeve member of a size smaller than the top opening. A larger bouquet of cut stems can be suspended by the edges of the top opening. A smaller bouquet of cut stems can be suspended by the edges of the slot. A suspension strap is attached to the sleeve member to allow it to be hung off the headrest of a car seat.

7 Claims, 7 Drawing Sheets

(56) References Cited

U.S. PATENT DOCUMENTS

| | | | | |
|---|---|---|---|---|
| 3,376,666 A | * | 4/1968 | Leonard | B65D 85/505 206/423 |
| 3,987,583 A | * | 10/1976 | Takeyasu | A01G 7/06 2/21 |
| 4,091,925 A | * | 5/1978 | Griffo | A01G 5/00 206/423 |
| 4,718,623 A | | 1/1988 | McClure | |
| 4,747,991 A | * | 5/1988 | Bishop | A61F 13/15731 264/154 |
| 4,750,292 A | * | 6/1988 | Alstig | A01G 13/10 383/37 |
| 5,335,476 A | * | 8/1994 | Weder | A01G 5/04 493/154 |
| D363,896 S | | 11/1995 | Bergmann | |
| 5,496,252 A | * | 3/1996 | Gilbert | B44F 1/08 493/188 |
| 5,592,776 A | * | 1/1997 | Weder | A01G 5/04 206/423 |
| 5,606,845 A | * | 3/1997 | Weder | A01G 5/04 53/397 |
| 5,706,604 A | * | 1/1998 | Yogi | A01G 9/02 220/495.11 |
| 5,715,629 A | * | 2/1998 | Hawkins | A01G 9/026 47/65.5 |
| 5,758,772 A | * | 6/1998 | Weder | A01G 5/04 206/423 |
| 5,832,694 A | * | 11/1998 | Weder | A01G 5/04 53/397 |
| 5,850,709 A | * | 12/1998 | Mahoney | A01G 13/04 47/1.01 R |
| 6,058,651 A | * | 5/2000 | Perez | A01G 9/024 47/65.8 |
| 6,108,974 A | * | 8/2000 | Herzog-Mesrobian | A47G 7/08 47/72 |
| 6,129,209 A | | 10/2000 | Tchira | |
| 6,665,982 B1 | | 12/2003 | Van Wingerden | |
| 6,786,003 B2 | * | 9/2004 | Gilbert | B65D 85/505 47/41.01 |
| D500,703 S | | 1/2005 | Giampavolo | |
| 6,896,164 B2 | | 5/2005 | Fialla-Dori | |
| 7,275,669 B1 | | 10/2007 | Aikens | |
| D565,964 S | | 4/2008 | Feenstra | |
| 7,870,983 B2 | * | 1/2011 | Chen | B60R 11/00 224/275 |
| 8,245,442 B2 | * | 8/2012 | Weder | B65B 25/026 47/72 |
| D685,290 S | | 7/2013 | Silvera | |
| 8,910,417 B1 | | 12/2014 | Meyers | |
| 2003/0188481 A1 | * | 10/2003 | Weder | A47G 7/085 47/72 |
| 2004/0000091 A1 | * | 1/2004 | Weder | A47G 7/085 47/72 |
| 2004/0103583 A1 | * | 6/2004 | Eriksen | A01G 9/026 47/67 |
| 2006/0283077 A1 | | 12/2006 | Viviano | |
| 2007/0028519 A1 | * | 2/2007 | Seibel | A47G 7/085 47/72 |
| 2008/0072484 A1 | | 3/2008 | Giampavolo et al. | |
| 2008/0202025 A1 | | 8/2008 | Temkin et al. | |
| 2009/0294597 A1 | * | 12/2009 | Weder | A01G 5/02 248/27.8 |
| 2010/0258602 A1 | * | 10/2010 | Amin | A45C 13/30 224/275 |
| 2011/0283613 A1 | * | 11/2011 | Downey | A01G 9/026 47/65.7 |
| 2013/0152466 A1 | * | 6/2013 | Hillson | A01G 9/026 47/65.7 |
| 2014/0131239 A1 | | 5/2014 | Lepoutre | |
| 2014/0208645 A1 | * | 7/2014 | Guggenheim | A01G 1/001 47/65.7 |
| 2015/0223418 A1 | * | 8/2015 | Collins | A01G 31/02 47/62 R |

OTHER PUBLICATIONS

Blumabag, blumabag.com, published Jul. 17, 2015, retrieved May 16, 2018.*

Flower Pozzy, www.flowerpozzy.com/, published Dec. 19, 2014, retrieved May 16, 2018.*

* cited by examiner

APPARATUS TO SUSPEND BOUQUETS IN A VEHICLE

BACKGROUND OF THE INVENTION

1. Field of the Invention

The present invention relates generally to the field of floral arrangements such as those known as pre-arranged bouquets in sleeves. More specifically, the present invention relates to an apparatus for suspending multiple bouquets of various sizes, including a handle for hanging over the headrest of a vehicle seat, to allow ease of use and to suspend bouquets in a vertical position.

2. Description of the Prior Art

Consumers frequently have occasions when they need to purchase more than one bouquet, but a complication for them is that there is no known safe way to transport multiple bouquets vertically in a vehicle without damaging the bouquet in transit. Prearranged bouquets come in standardized sizes, large, medium, and small, with small meaning a small cluster of flowers or greenery or one stem. A problem with all known prior art systems for transporting bouquets is that they provide a container that holds only one arrangement flowers to be carried therein, and do not permit ease of transport of multiple bouquets of different sizes in a single device.

One example of a floral sleeve is disclosed in U.S. Pat. No. 6,129,209. The device described therein provides for retaining cut stems of several different types of plants, where the stems each have a stem cut end, and including a tube of sheet material having a tube upper end and a tube lower end with longitudinal dividers formed of sheet material extending across the interior of the tube. The dividers define at least two plant stem longitudinal compartments. Thus, the divider defines compartments where different types of plant stems can be inserted. The device includes a cut out, which serves as a handle and carrier, and is closed at the bottom, requiring that the stems be supported at their lower end through support by the closed bottom portion of the device. This device is incapable of being used to transport multiple bouquets safely in a vehicle like an automobile.

U.S. Pat. No. 591,390 discloses a flower holder for bicycles, which attaches to the handle of a bicycle. The flower holder is a simple vase type device attached to the handlebar engaging mechanism, which engages to the bicycle handle. The flower holder can only hold one group of flowers in the vase.

U.S. Pat. No. 8,910,417 discloses a cut flower container which includes a base, top, and sides, which are constructed to hold cut flowers and water. The top has a carrying element, which has an adjustable functional member for transport and attachment to a suspending element.

U.S. Pat. No. D500,703 discloses another example of a flower bouquet holder which is closed at the bottom and includes a hooking arrangement for hooking to, for example, a grocery cart, etc. This device cannot be used to transport bouquets safely in a vehicle.

U.S. Pat. D685,290 discloses a flower bouquet for use in an automobile and/or a shopping cart, including two straps which connect to secure the single compartment bouquet bag to wherever it is desired to be secured.

A problem with the prior art arrangements is that they generally allow for only one arrangement of flowers to be carried therein and do not permit ease of transport of different size bouquets in a single device, without damaging the respective bouquets being carried thereby. In accordance with the invention, these problems are avoided, and there is provided a sleeve apparatus which can easily suspend at least two bouquets of different sizes in a manner where they are securely held and can be suspended within a car, for example, on a headrest thereof without damaging the bouquets in transport.

It is therefore a principal object of the present invention to provide a sleeve-like apparatus capable of suspending multiple bouquets in a single device for safe transport in a vehicle.

Another objective of the invention is to provide an apparatus with openings capable of suspending different sizes of bouquets within a single device.

Yet another object of the present invention is to provide an apparatus that can suspend bouquets below the front or the back of a vehicle headrest. Thus, making it reversible in terms of which side of the vehicle headrest the bouquets are suspended.

BRIEF SUMMARY OF THE INVENTION

In accordance with the invention in one embodiment there is provided a sleeve apparatus for transporting at least two bouquets of cut stems of plants, and preferably three bouquets. The bouquets are typically of different size with respect to each other. The apparatus includes a sleeve member having an open top and an open bottom. The open top end is of a size sufficient to support, by engagement with edges defining the open top, a bouquet of cut stems of a relatively largest size which is, receivable within the sleeve member through the open top in a manner to keep the bouquet of cut stems from slipping through the sleeve member through an open bottom. This is accomplished with engagement with the edges of the sleeve making up the open top. A first cutout slot is provided in a wall of the sleeve member. The cutout slot on the side of the sleeve is of a size sufficient to receive a second bouquet of a size smaller of the bouquet of relative largest size. By the expression "relative largest size" is intended to refer to a bouquet of a size which can be retained by the edges of the sleeve member defining the opening at the top.

The second bouquet is received within the slot in the wall of the sleeve in a manner supported by edges defining the first cutout slot to prevent the second bouquet from falling out through the open bottom end of the sleeve member. A suspension strap is connected to the sleeve member in a manner to allow suspending the sleeve member, and the suspension strap is of a size sufficient to be hung from the headrest of the seat of an automobile.

In a more specific aspect, there is provided a second cutout slot in a wall of the sleeve member of a size sufficient to receive and retain with edges thereof a third bouquet of a relatively small size such as a small cluster of flowers or greenery of cut stems, or a single stem, of a size smaller than the second bouquet.

BRIEF DESCRIPTION OF THE DRAWINGS

Having briefly described the invention, the same will become more clearly understood from the following detailed description made with reference to the appended figures wherein.

DETAILED DESCRIPTION OF THE PREFERRED EMBODIMENTS

In general, the apparatus of the invention may be formed of a generally rectangular shape, flexible material. First slots are cut and sewn into the material while in a flat position before the apparatus is assembled. Thereafter, in one embodiment, ends of a single material strip are sewn together to form a circumferential shape. The seam of the strip, which has been sewn to itself is then positioned in the middle of what becomes the back wall. A suspension handle is next attached down the length of each side of the apparatus. Other embodiments of the apparatus can have different shapes, such as a cone like shape with or without a closed bottom, as trapezoid shape, a sling-strap configuration or any shape that can suspend bouquets from the headiest of a vehicle.

When in use, the apparatus is simple. Pre-arranged bouquets can be merely dropped into the appropriate opening of the apparatus. The bouquets are at once suspended for transport without damaging the respective bouquets being suspended therein.

Having generally described the invention, the remaining discussion is made with reference to the appended figures from which the invention and its use will become more readily apparent.

Figure 1:
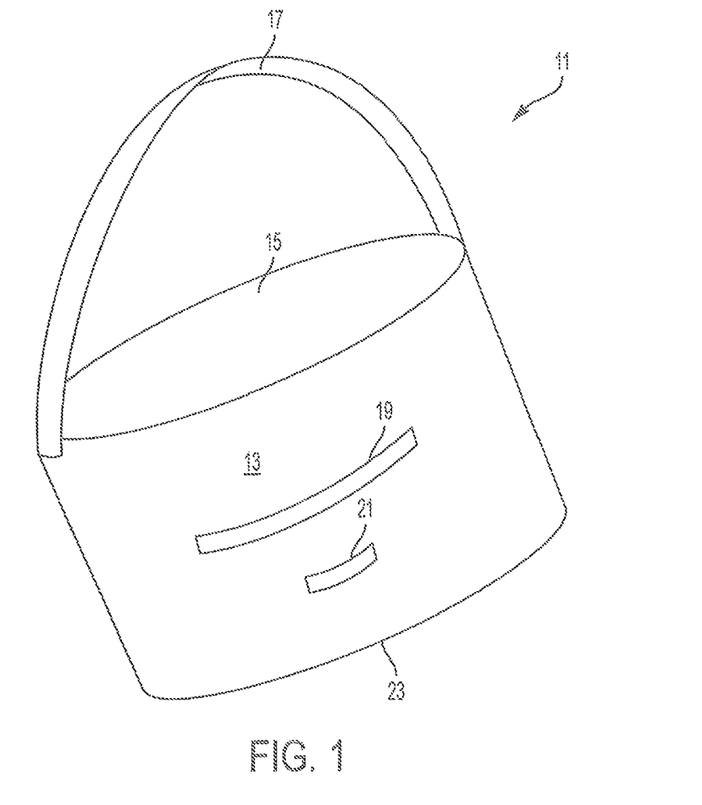
FIG. 1 is a perspective view from the top of the sleeve apparatus of the invention.
Figure 2:
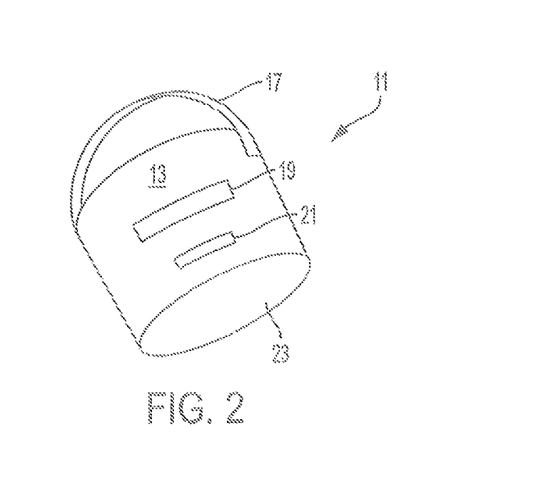
FIG. 2 is a perspective view from the bottom of the sleeve apparatus of the invention.

FIG. 1 illustrates in perspective view from the top an embodiment of the sleeve apparatus 11 in accordance with the invention. The sleeve apparatus 11 includes a sleeve member 13 making up a generally circumferential shape of having a top opening 15 and a bottom opening 23. To allow different size bouquets to be suspended at the same time, a slot 19 of a size smaller than opening 15 is cut into a wall of the sleeve member 13 of the sleeve apparatus 11. This slot 19 is sized to allow the stems of a bouquet of smaller size than that receivable and supported through top opening 15 to be inserted into slot 19 and retained therein by edges (not numbered) defining the slot.

In a more specific aspect, there is also provided a second slot 31 which is sized to support a small bouquet or even a single flower stem allowing up to three bouquets to be suspended and held in a single apparatus in a manner where the bouquets do not become damaged and are suspended in an apparatus which is easy and simple to construct and flexible to use.

Figure 3:
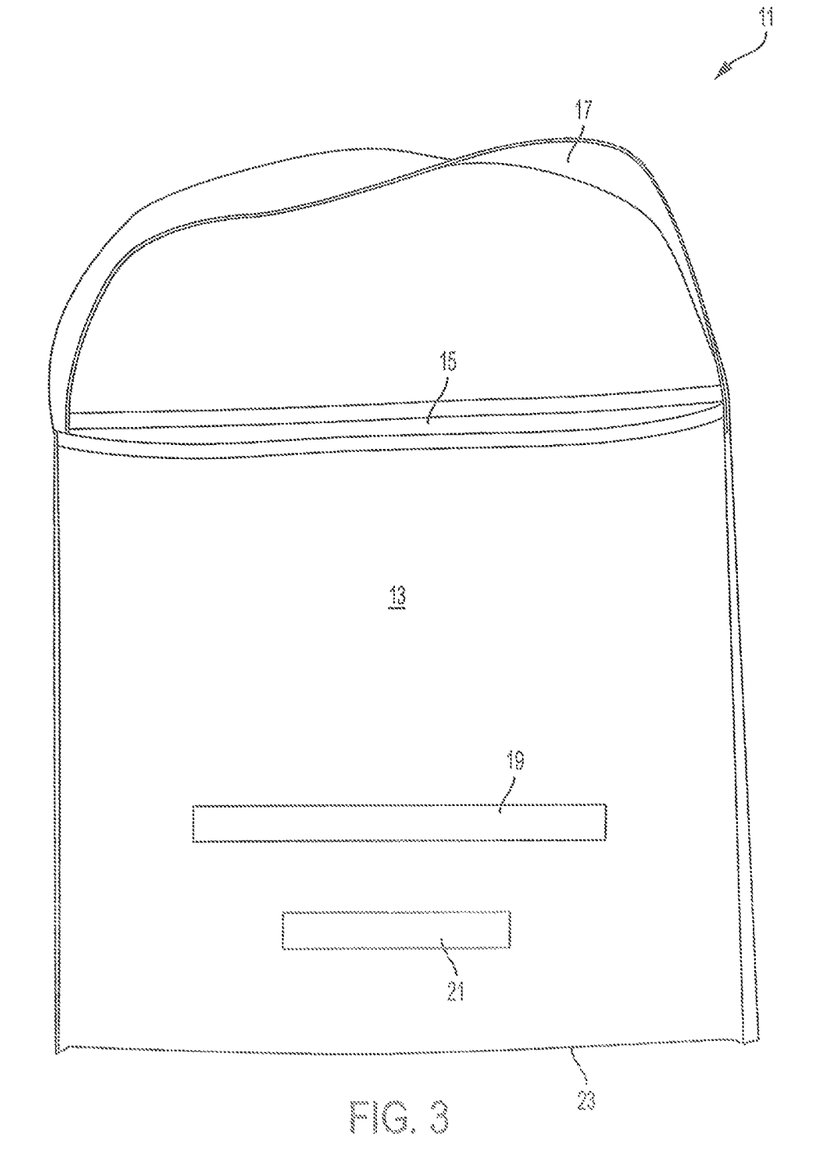
FIG. 3 is a plan view of one embodiment of the bouquet suspension sleeve member of the sleeve apparatus in accordance with the invention from one side thereof.
Figure 4:
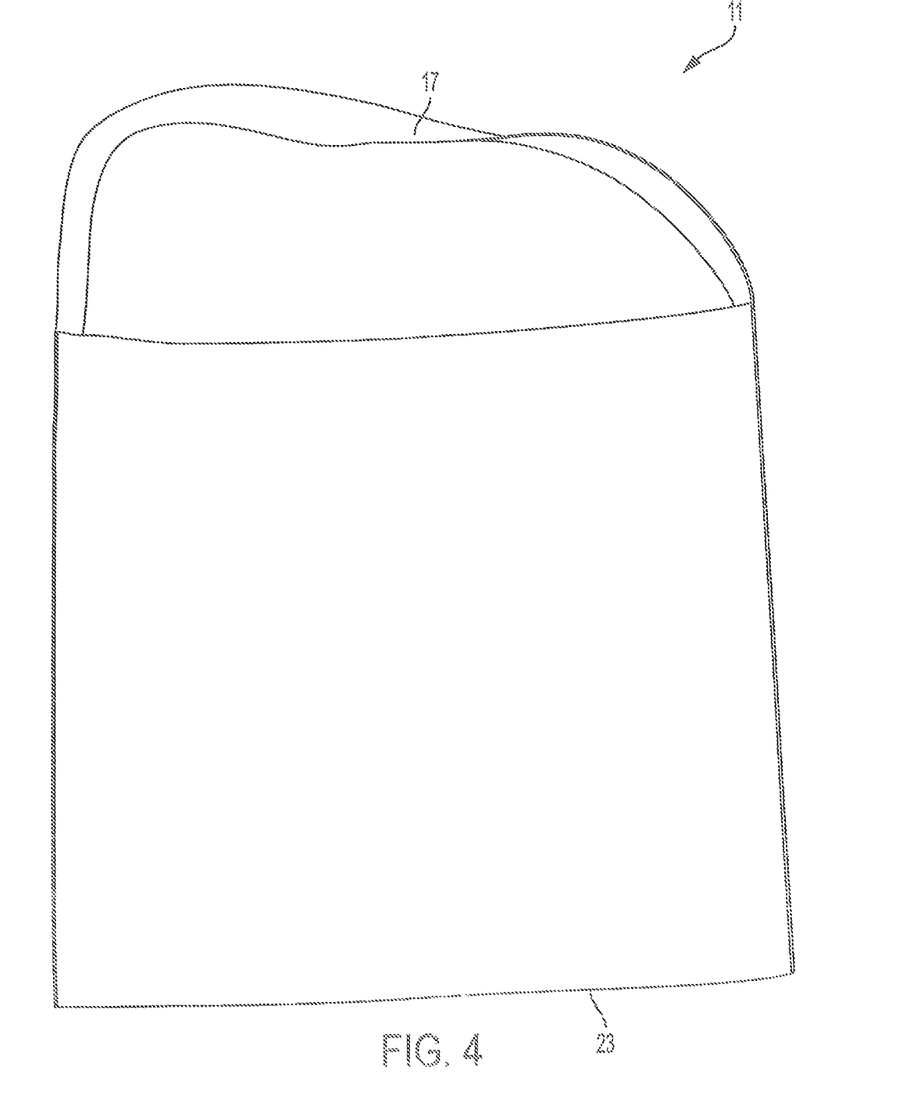
FIG. 4 is a plan view from the other side thereof, as in FIG. 3, of the sleeve member for suspending bouquets in accordance with the invention.

FIGS. 3 and 4 show plan view of two different sides of the suspension apparatus 11 of the invention. FIG. 3 illustrates a side of the suspension apparatus 11 where both slots 19 and 31 are shown on one side. FIG. 4 illustrates the back side with no slots being shown.

Figure 5:
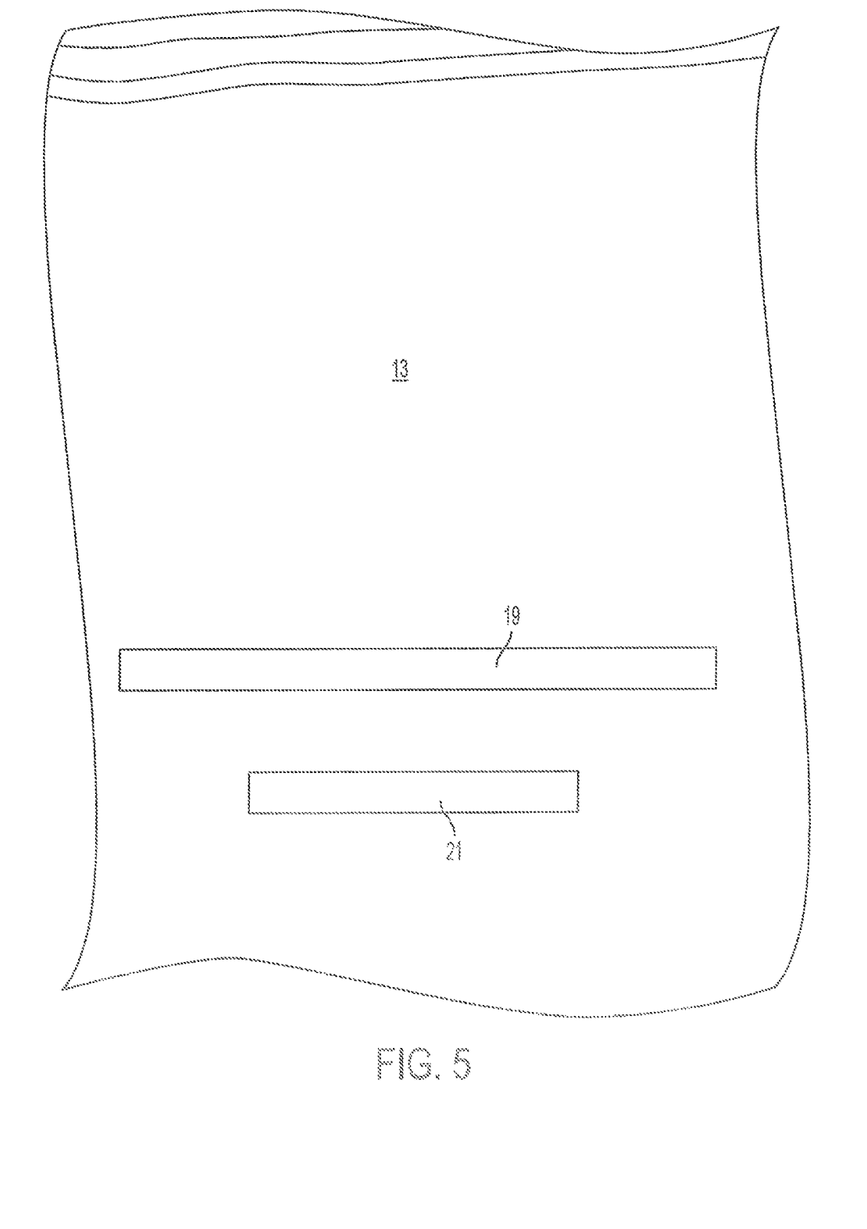
FIG. 5 is an enlarged view showing cutouts in the sleeve member of the invention for suspending two different size bouquets.

FIG. 5 illustrates an enlarged view of the two slots 19 and 31 on the sleeve member 13 of the invention.

Figure 6:
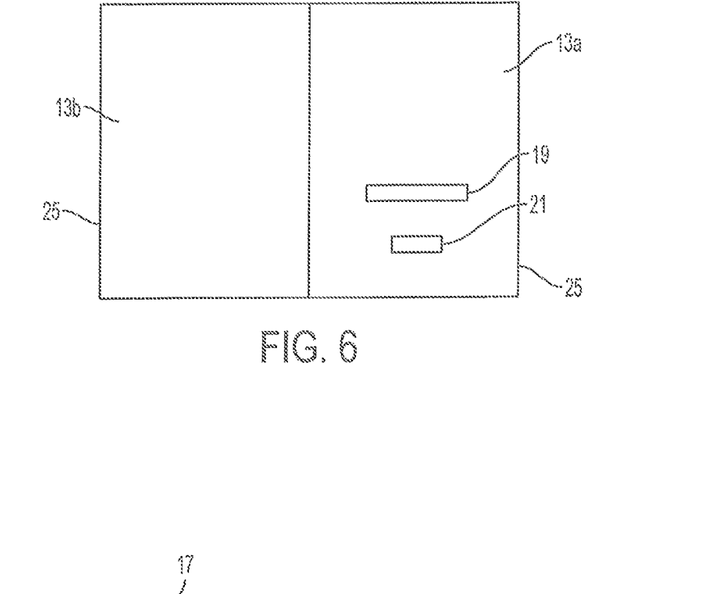
FIG. 6 is a partially disassembled view showing two panels which are secured together to form the sleeve member of the sleeve in accordance with the invention.

As shown in FIG. 6, when assembling the sleeve member 13 of the invention, in one embodiment it may be made up of two panels 13a and 13b making up the member 13 of the sleeve apparatus 11. As illustrated in FIG. 6, in which the two panels are partially connected at one horizontal edge of each, the panels can then be folded over and secured at horizontally located edges 25 to form the sleeve member 13 of the suspension apparatus 11. These panels 13a and 13b make up the sleeve member 13 of the apparatus 11 and can be made of materials like a flexible fabric.

Figure 7:
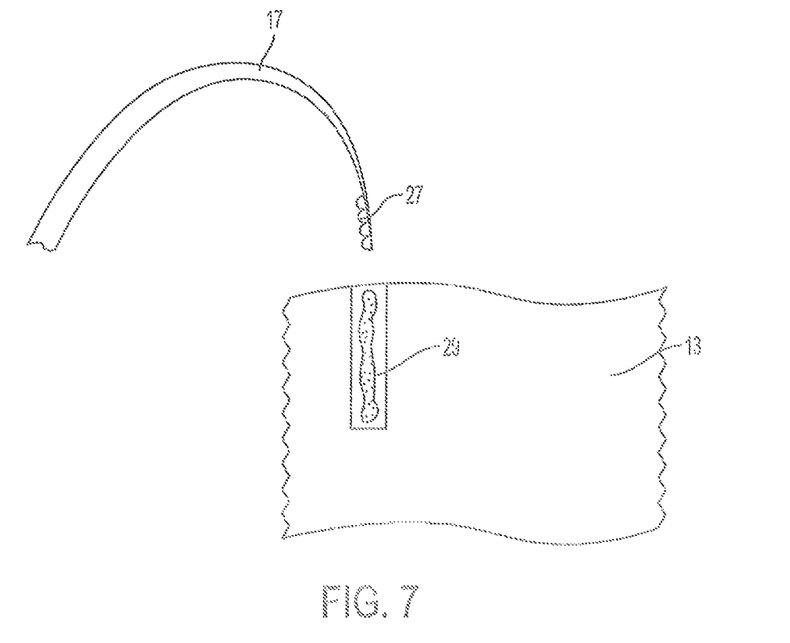
FIG. 7 is a partial view of a handle assembly in accordance with the invention with a hook and loop attaching mechanism for having the strap of the sleeve member be adjustable for allowing use with different headrest sizes.

FIG. 7 illustrates in partial view one embodiment of the handle attachable to the sleeve member 13 with a hook and loop connecting arrangement 27, 29. This connecting arrangement allows adjustment of the length of the strap so that it can be adjusted in length to accommodate different size headrests.

As may be appreciated, the device can be made of different materials, preferably a flexible fabric can be used to provide ease of foldability and storage. With respect to a hook and loop connecting arrangement 27, 29, as will be apparent to those of ordinary skill in the art, different adjustable mechanisms can be used, including such arrangements as a double strap with an adjustable buckle to allow adjustment of the length of the strap to a desired length.

Figure 8:
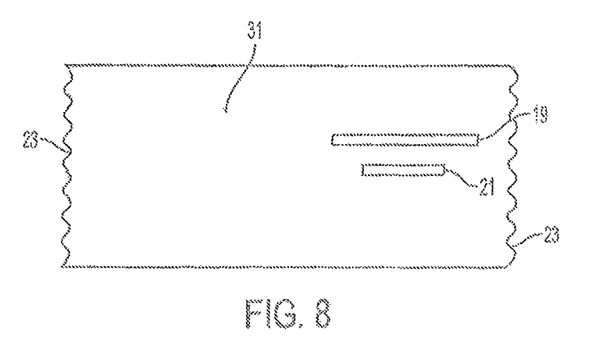
FIG. 8 illustrates a strip of material which is a single strip from which an alternate embodiment al the apparatus of the invention can be made, and showing two different size slots cut into the strip.
Figure 9:
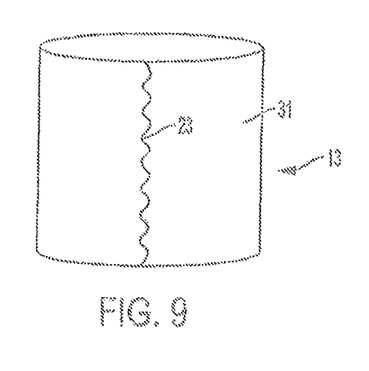
FIG. 9 shows the strip of FIG. 8 having been folded over and sewn together to join two ends thereof to form a sleeve.
Figure 10:
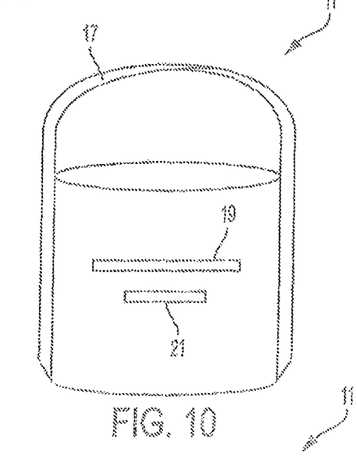
FIG. 10 illustrates an apparatus in accordance with the invention manufactured from the single strip of FIG. 8 and showing a suspension handle attached thereto.
Figure 11:
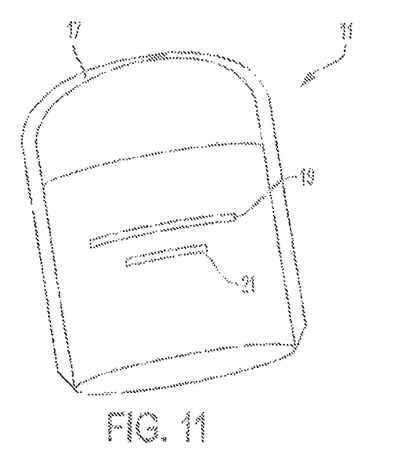
FIG. 11 illustrates the apparatus of FIG. 10 in perspective view.

FIG. 8 illustrates an alternative material arrangement for manufacturing the apparatus 11 of the invention. More specifically, FIG. 8 illustrates a single strip of fabric 31 having two edges 23. As illustrated in FIG. 9 the fabric is folded over itself and the edges 23 are connected and sewn together in an alternative embodiment of the sleeve member 31. As further illustrated in FIGS. 10 and 11, a suspension strap 17 can be attached to the apparatus 11 and for maximum support and security, the strip extends along the length of each side to which it is connected to the sleeve member 13 of the apparatus 11.

Figure 12:
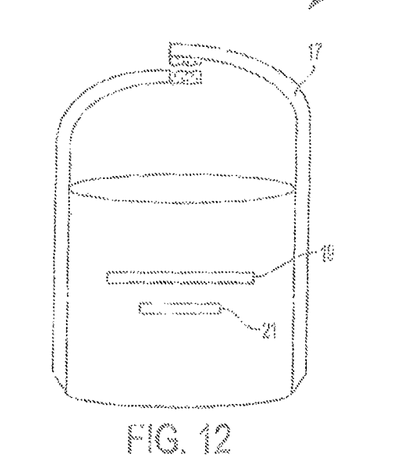
FIG. 12 illustrates an alternative embodiment of the apparatus with a suspension strap having a section which separates into two ends which connect to each other with a hook and loop arrangement to allow adjustment.
Figure 13:
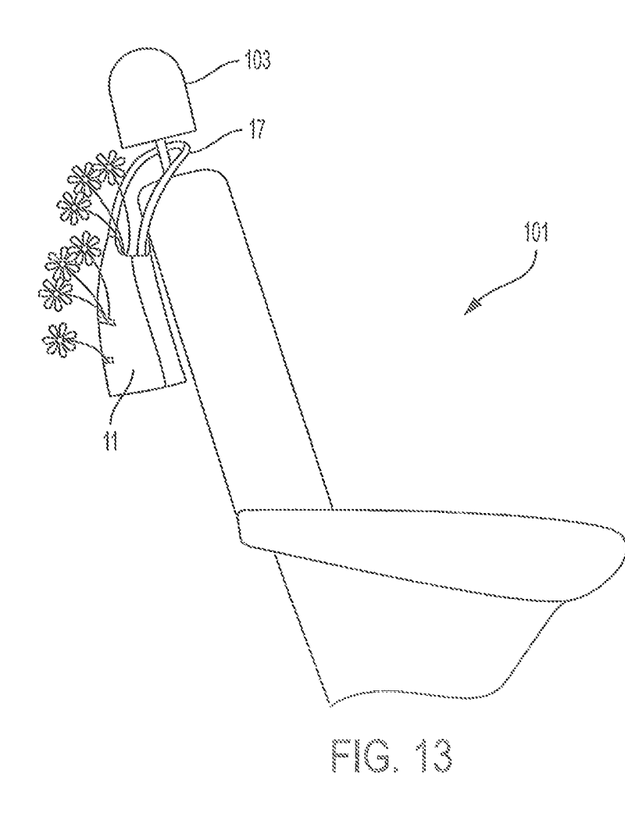
FIG. 13 illustrates the apparatus of the invention with bouquets carried therein and suspended off the headrest of an automotive vehicle's seat.

In a further alternative embodiment as illustrated in FIG. 12, the strap 17 is reversible so it can hang from the headrest of a seat, either towards the front or towards the back. FIG. 13 illustrates an arrangement where there is a seat 101 having a headrest 103 on the top thereof. The strap 17 hooks around and is suspended from the headrest 103 to suspend the apparatus of the invention with bouquets therein off of the headrest 103 of a car seat 101.

While the invention has been described, disclosed, illustrated, and shown in various terms or certain embodiments, or modifications which it has assumed in practice, the scope of the invention is not intended to be, nor should it be deemed to be, limited thereby and such other modifications or embodiments as may be suggested by the teachings herein are particularly reserved especially as they fall in the breadth and scope in the claims here appended.

What is claimed is:

1. A sleeve apparatus retaining at least two bouquets of cut stems of plants, the bouquets being of different size with respect to each other, the apparatus comprising:
   a) a sleeve member having an open top and an open bottom, said open top of a size sufficient to support by engagement with edges defining the open top, a bouquet of cut stems of a relative largest size which is receivable within the sleeve member through the open top, in a manner to keep the bouquet of cut stems from slipping through the sleeve member through the open bottom as a result of engagement with the edges defining the open top;
   b) a first bouquet of cut stems received within the sleeve member through the open top, said first bouquet being of a size sufficient to engage the edges defining the open top and be supported thereby to keep the first bouquet from slipping through the sleeve member and through the open bottom;
   c) a first cutout slot in a wall of the sleeve member of a size sufficient to receive a second bouquet of cut stems of a size smaller than the bouquet of relative largest size, within the sleeve member in a manner supported by edges defining the first cutout slot to prevent the second bouquet from falling through the sleeve member and through the open bottom of the sleeve member, as a result of engagement with the edges defining the first cutout slot;
   d) a second bouquet of cut stems received within the sleeve member through the first cutout slot, said second bouquet being of a size sufficient wherein it is supported by the edges defining the first cutout slot preventing the second bouquet from slipping through the sleeve member and through the open bottom of the sleeve member, as a result of engagement with the edges defining the first cutout slot; and
   e) a suspension strap attached to the sleeve member and of a size sufficient to hang from a headrest of an automobile seat.

2. The sleeve apparatus of claim 1, further comprising:
   a) a second cutout slot in the wall of the sleeve member of a size sufficient to receive a third bouquet of cut stems of a size smaller than the second bouquet within the sleeve member in a manner supported by edges defining the second cutout slot to prevent the third bouquet from falling through the sleeve member and though the open bottom of the sleeve member, as a result of engagement with the edges defining the second cutout slot; and
   b) a third bouquet of cut stems received within the sleeve member through the second cutout slot, said third bouquet being of a size wherein it is supported by the edges defining the second cutout slot preventing the third bouquet from slipping through the sleeve member and through the open bottom of the sleeve member, as a result of engagement with the edges defining the second cutout slot.

3. The sleeve apparatus of claim 1, wherein the sleeve member is made of flexible fabric.

4. The sleeve apparatus of claim 1, wherein the sleeve member is comprised of two panels, each having two edges, and attached to each other at the edges to form the sleeve member.

5. The sleeve apparatus of claim 1, wherein said suspension strap is adjustable in length.

6. The sleeve apparatus of claim 1, wherein said suspension strap can be adjusted by having a hook and loop arrangement to allow adjustment of suspension strap.

7. The sleeve apparatus of claim 1, wherein the sleeve member is comprised of one panel folded having two edges and having its edges attached to each other to form the sleeve member.

\* \* \* \* \*